United States Patent
Deiss

(10) Patent No.: US 8,329,275 B2
(45) Date of Patent: *Dec. 11, 2012

(54) SEALING TAPE FOR SEALING A GAP

(75) Inventor: Martin Deiss, Abtsgmuend (DE)

(73) Assignee: ISO-Chemie GmbH (DE)

( * ) Notice: Subject to any disclaimer, the term of this patent is extended or adjusted under 35 U.S.C. 154(b) by 734 days.

This patent is subject to a terminal disclaimer.

(21) Appl. No.: 12/448,383

(22) PCT Filed: Dec. 5, 2007

(86) PCT No.: PCT/EP2007/010565
§ 371 (c)(1),
(2), (4) Date: Jun. 18, 2009

(87) PCT Pub. No.: WO2008/074400
PCT Pub. Date: Jun. 26, 2008

(65) Prior Publication Data
US 2010/0086719 A1 Apr. 8, 2010

(30) Foreign Application Priority Data
Dec. 18, 2006 (EP) .................... 06026193

(51) Int. Cl.
*B32B 9/00* (2006.01)
*B32B 33/00* (2006.01)
*B32B 3/26* (2006.01)
*B32B 7/12* (2006.01)
*E04C 1/00* (2006.01)

(52) U.S. Cl. .................... 428/40.1; 428/158; 428/304.4; 428/317.1; 428/317.3; 52/309.1; 52/309.4; 52/309.5

(58) Field of Classification Search .......... 428/40.1, 428/906, 41.7, 41.8, 158, 304.4, 317.1, 317.3; 52/309.1, 309.4, 309.5
See application file for complete search history.

(56) References Cited

U.S. PATENT DOCUMENTS

| 3,713,263 | A |   | 1/1973 | Mullen |   |
|---|---|---|---|---|---|
| 4,181,711 | A |   | 1/1980 | Ohashi et al. |   |
| 4,204,373 | A |   | 5/1980 | Davidson |   |
| 4,356,676 | A | * | 11/1982 | Hauptman | .............. 52/396.04 |
| 5,489,468 | A | * | 2/1996 | Davidson | .................. 442/374 |

(Continued)

FOREIGN PATENT DOCUMENTS

| DE | 17 84 467 | 11/1971 |
| DE | 24 57 322 | 6/1976 |

(Continued)

*Primary Examiner* — Patricia Nordmeyer
(74) *Attorney, Agent, or Firm* — Jansson Shupe & Munger Ltd.

(57) ABSTRACT

A sealing tape for sealing a gap between a structural element such as a frame profile element of a window or door and a building consists of a soft foam strip (1) of rectangular cross section, which is provided on one of its narrow sides with a self-adhesive layer (4), which is covered by a second peel-off cover film (5), a connecting strip (2) of a flexible material, one edge of which is attached to the narrow side of soft foam strip (1) provided with self-adhesive layer (4), and a sealing film strip (3) for bridging said gap, which strip is provided with a self-adhesive layer (6) in an area intended to be adhered to the structural element, which self-adhesive layer is covered by a first peel-off cover film (7), and which is connected by its edge area provided with self-adhesive layer (6) to the other edge of connecting strip (2).

11 Claims, 1 Drawing Sheet

U.S. PATENT DOCUMENTS

| | | | |
|---|---|---|---|
| 6,548,163 B1 * | 4/2003 | Hills | 428/343 |
| 2002/0142159 A1 * | 10/2002 | Dutton | 428/343 |

FOREIGN PATENT DOCUMENTS

| | | |
|---|---|---|
| DE | 41 23 647 | 12/1992 |
| DE | 43 07 528 | 9/1994 |
| DE | 196 41 415 | 4/1998 |
| DE | 297 15 660 | 7/1999 |
| DE | 199 44 611 | 3/2001 |
| DE | 10 2004 012 473 | 10/2005 |
| EP | 0 072 955 | 8/1982 |
| WO | WO 98/45565 | 10/1998 |

* cited by examiner

SEALING TAPE FOR SEALING A GAP

FIELD

The present invention pertains to a sealing tape for sealing a gap between a structural element such as a frame profile element such as a window or door and a building.

BACKGROUND

Various systems are known (see DE 10 2004 012 473 A1) which can be used to seal off the frame profile elements of, for example, windows or doors in building openings after the frame has been fixed mechanically in place in the opening. DE 43 07 528 A1 describes a sealing tape consisting of an elastically recoverable soft foam strip, which, in compressed form, is surrounded by a tear-open covering, to the inside surface of which the soft foam strip is adhered. The covering has a tab on the side, by which it can be torn open. The covering is also provided on its exterior with a double-sided adhesive strip, which, when the sealing tape is in the as-delivered state, that is, rolled up into a roll, is covered by a cover film. To install the sealing tape on the frame of a window or door, the cover film is first removed, and then the sealing tape is adhered to the frame profile element by means of the previously mentioned adhesive strip. This can be done at the factory. After the frame has been fixed in place mechanically at the construction site in a building opening intended for it, the covering is torn open by the previously mentioned tab, so that the soft foam strip can expand from its compressed state and press itself against the surfaces of the reveal in the building opening. As the tear-open tab projects loosely from the sealing tape, there is the danger that, when the frame provided with the sealing tape is being handled during transport and installation, the covering can be torn open unintentionally. Such would have the result of the soft foam strip expanding in the area of the tear. This would make the work of installing the frame in the opening in the building more difficult. Since the tear-open tab projects laterally from the soft foam strip, it is difficult to stack the sealing tapes after they have been wound up into rolls. Such prevents the sealing tape rolls from lying flat on top of each other making storage more difficult. It should also be noted that in many cases a seal formed only by foam tape between a frame and a reveal does not offer the required sealing properties, especially when a vapor barrier is required.

A tape-like connecting element between a frame component and a masonry wall is known from DE 10 2004 012 473 A1. This element can be adhered to the frame component and has a releasable reserve of elastic material to allow expansion in the transverse direction. On its free edge, it is provided with a permanent adhesive layer, by means of which it can be adhered to the masonry. On the side facing away from the permanent adhesive layer, it is provided with a support layer for plaster in the form of a nonwoven fabric, which is intended to ensure the adhesion to the plaster. This sealing tape is also subject to the danger that, after it has been attached to the frame element at the factory, it can be damaged during transport, because the expansion reserve projects like a flag from the frame profiles and can flutter back and forth.

A seal for a frame element in the opening of a building must often fulfill the demand that it be impermeable to vapor or that it offer other sealing properties. Neither a soft foam tape nor a film strip alone can meet these requirements.

SUMMARY

It is therefore an object of the present invention to provide a sealing tape which combines the advantages of both foam seals and film seals and which simultaneously offers the advantage that the sealing tape can be wound up into a compact roll and attached, without any outward-projecting parts, to a frame element at the factory.

The invention combines a strip of soft elastic foam with a film strip in such form that, upon installation of a frame element into a building opening, a seal can be produced by the soft foam tape and by the film strip, which is parallel to and a certain distance away from the foam, wherein the possibility exists of injecting additional construction foam into the intermediate space between the soft foam strip and the film strip before the film strip is adhered to the reveal of the building opening.

The sealing tape can be attached to the frame element at the factory and forms a compact unit, which eliminates any projection thereby avoiding potential damage during transport and installation of the frame element.

BRIEF DESCRIPTION OF THE DRAWINGS

The invention is explained in greater detail below with reference to the exemplary embodiment illustrated in the drawing.

DETAILED DESCRIPTION

Figure 1:
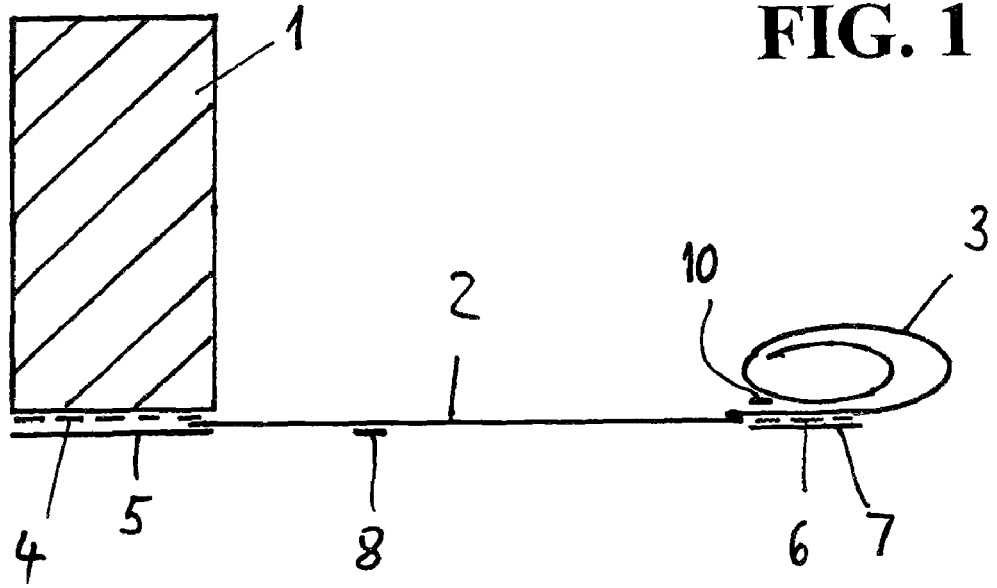
FIG. 1 is a cross-sectional view of a sealing tape according to the invention in an expanded state.

The sealing tape according to the invention consists, as shown in FIG. 1, of an elastically compressible and recoverable soft foam strip 1 of rectangular cross section, a connecting strip 2, and a sealing film strip 3, which are permanently bonded to each other. The soft foam strip 1 is shown in an expanded state in FIG. 1. On one of its narrow sides, i.e., the bottom surface, it is provided with a first self-adhesive layer 4, which is covered by a first peel-off cover film 5. A first edge of the connecting strip 2 is inserted under first cover film 5 and permanently adhered to soft foam strip 1, possibly after the insertion of an intermediate strip of fabric scrim. Connecting strip 2 consists of a flexible material such as a plastic film, especially a transparent film, but it can also be formed by a fabric scrim.

Sealing film strip 3 is firmly connected to a second edge of connecting strip 2 by the use of an adhesive, for example, or by welding.

It should be pointed out that, instead of the hybrid design shown in FIG. 1, it is also possible to use an integral design, in which connecting strip 2 and sealing film strip 3 are formed as an integral part and consist of the same material, the width of which in this case would be increased to the appropriate extent. The hybrid design offers advantages when the sealing film strip is relatively stiff and therefore is less suitable for the formation of a pocket, into which soft foam strip 1 can be inserted, as will be described further below.

In FIG. 1, sealing film strip 3 is still wound up. Its bottom layer, which adjoins connecting strip 2, carries a second self-adhesive layer 6, which is covered by a second cover film 7. Sealing film strip 3 has the purpose of being unwound so that its edge area, shown lying on the inside of the roll in FIG. 1, can be adhered to a reveal by means of, for example, a permanent adhesive based on butyl rubber (not shown).

In an alternative embodiment, as previously mentioned, connecting strip 2 may consist of a fabric scrim, which is embedded in first self-adhesive layer 4 on soft foam strip 1. Connecting strip 2 may alternatively consist of a film, which extends over the entire first self-adhesive layer 4 on soft foam strip 1 and includes openings, through which first self-adhesive layer 4, in which the film is embedded, is exposed to the outside. Such openings are large enough to ensure that the adhesive can exert its effect through them to the outside, being exposed to ambient air.

Figure 2:
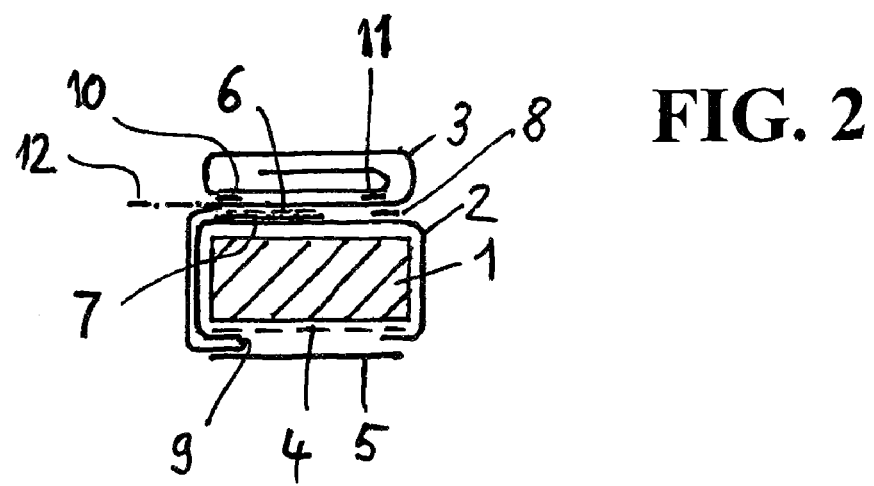
FIG. 2 is a cross sectional view of the sealing tape of FIG. 1 in a state in which it can be wound up into a roll.

FIG. 2 shows the arrangement of FIG. 1 in a state in which the sealing tape is suitable for being wound up into a compact roll.

In the state shown in FIG. 2, soft foam body 1 has been compressed. Connecting strip 2 is wrapped around compressed soft foam strip 1 and detachably adhered to first self-adhesive layer 4 on the bottom surface thereof, where first self-adhesive layer 4 is located, to form a fold 9. Connecting strip 2 is guided back to the top surface of the soft foam strip 1. There, in the area of one edge of the sealing tape, sealing film strip 3 is firmly connected to the exterior layer of connecting strip 2.

Sealing film strip 3, which has been rolled up transversely into a roll, lies on connecting strip 2, where second cover film 7 prevents second self-adhesive layer 6 from sticking to connecting strip 2. In the other edge area of the sealing tape, sealing film strip 3 is adhered to connecting strip 2 lying on soft foam strip 1 by means of a releasable, adhesive bond 8. Instead of an adhesive bond, an ultrasound or thermowelding process can be performed to adhere sealing film strip 3 to connecting strip 2 at point 8.

Sealing film strip 3 is prevented from unrolling by a releasable adhesive bond 10, which can consist of individual dots of adhesive or of an adhesive strip, and which adheres the layer of the wound-up sealing film strip 3 beginning at connecting strip 2 to the following layer of the roll. Here, too, it is possible instead to use an ultrasound or thermowelding process. Another adhesive or welded bond 11 can be provided on the side of the outermost roll layer of sealing film strip 3 facing away from pressure-sensitive adhesive bond 8. If the roll consisting of sealing film strip 3 has only a single turn, the adhesive bond is preferably provided at point 11.

In the state shown in FIG. 2, the sealing tape is ready to be attached to a frame element. For this purpose, it is necessary merely to peel off first cover film 5 from the sealing tape and to stick the sealing tape by means of the first self-adhesive layer 4 to the frame element. In this state, the frame element, thus equipped at the factory, can be delivered to the construction site. There, after the frame element has been fixed mechanically in the building opening provided for it, connecting strip 2 is freed from its releasable connection to first self-adhesive layer 4 in the area where it forms fold 9 (see FIG. 2).

For this purpose, rolled-up sealing film strip 3 is lifted from soft foam strip 1 on the side shown on the right in FIG. 2 until adhesive bond 8, between sealing film strip 3 and connecting strip 2, is released. Then it is possible to grip rolled-up sealing film strip 3 and to pull it toward the right over soft foam strip 1. As this is being done, connecting strip 2 becomes released from its adhesive bond to soft foam strip 1 in the area of fold 9, as a result of which the pocket previously formed by connecting strip 2 for soft foam strip 1 is opened. Soft foam strip 1 can now recover elastically from its compressed state. This recovery can take place in a delayed manner, if desired, by impregnating the soft foam material with a material which delays the recovery process.

It is now possible to spread out connecting strip 2 out toward the right, and after second cover film 7 has been peeled off, sealing film strip 3 is adhered by means of second self-adhesive layer 6 to the frame element. Now, possibly after the intermediate space between the frame element and the building reveal has been filled with foam, sealing film strip 3 can be unwound and adhered to the opposing reveal of the building opening. It is advantageous for this purpose that the free edge area of sealing film strip 3 is provided with a layer of permanent adhesive, such as a butyl rubber adhesive, which can be covered, if desired, by another peel-off cover film (not shown).

To facilitate the release of sealing film strip 3 from the state shown in FIG. 2, especially when it is to be pulled off initially to the left in FIG. 2, the outer end of sealing film strip 3 connected to connecting strip 2 can be extended in FIG. 2 to form a tab, which projects toward the left and can be easily gripped. This tab is drawn in dash-dot line in FIG. 2 at 12.

Sealing film strip 3 can be a nonwoven strip provided with a vapor barrier film, which facilitates plastering, and its edge area can be provided with a layer of permanent adhesive, such as butyl rubber or the like, which is covered by a peel-off cover film. In this respect, reference can be made to the prior art, so that a detailed explanation of these features is not necessary here. It should also be emphasized that the outer turn of sealing film strip 3 does not necessarily have to be wound up but can instead be folded up in zigzag fashion. The outer turn is important for holding sealing film strip 3 together in the as-delivered state in cases where it is desired to do so without inner adhesive bonds between all the layers of sealing film strip 3.

While the invention has been described and illustrated in conjunction with specific preferred embodiments, it will be evident that many alternatives, modifications, variations and combinations will be apparent to those skilled in the art. Any such changes may be made without departing from the spirit and scope of the invention. The described and illustrated embodiments are to be considered in all respects only as illustrative and not restrictive. These and all other similar modifications and changes are considered to be within the scope of the present invention.

The invention claimed is:

1. A sealing tape for sealing a gap between a frame profile element of a window or a door and a building, comprising:
    a soft foam strip of rectangular cross section having lateral surfaces, a top surface and a bottom surface, wherein a first self-adhesive layer is arranged on the bottom surface and is covered by a first peel-off cover film;
    a sealing film strip comprising a vapor barrier film and provided with a second self-adhesive layer in an edge area thereof, the second self-adhesive layer being covered by a second peel-off cover film and serving for being adhered to the frame profile element; and
    a connecting strip of a flexible material having first and second edges, the first edge being firmly attached to the bottom surface of the soft foam strip, and the second edge being firmly attached to the edge area of the sealing film strip.

2. The sealing tape according to claim 1, wherein a fabric scrim is embedded in the first self-adhesive layer on the soft foam strip, wherein the fabric scrim is attached to the connecting strip.

3. The sealing tape according to claim 1, wherein a fabric scrim is embedded in the first self-adhesive layer on the soft foam strip, wherein the fabric scrim forms the connecting strip.

4. The sealing tape according to claim 1, wherein the connecting strip comprises an edge area provided with openings and is embedded in the first self-adhesive layer on the soft foam strip.

5. The sealing tape according to claim 1, wherein the connecting strip and the sealing film strip form an integral unit consisting of the same material.

6. The sealing tape according to claim 1, wherein the sealing film strip is formed by a nonwoven strip with an integrated vapor barrier film.

7. A sealing tape roll consisting of a wound-up sealing tape, which sealing tape comprises:
- a compressed, recoverable soft foam strip of rectangular cross section having lateral surfaces, a top surface and a bottom surface, wherein a first self-adhesive layer is arranged on the bottom surface and is covered by a first peel-off cover film;
- a sealing film strip comprising a vapor barrier film and provided with a second self-adhesive layer in an edge area thereof, the second self-adhesive layer being covered by a second peel-off cover film and serving for being adhered to the frame profile element; and
- a connecting strip of a flexible material having first and second edges, the first edge being firmly attached to the bottom surface of the soft foam strip, and the second edge being firmly attached to the edge area of the sealing film strip;
- wherein the sealing film strip is wound up into at least one turn, a width of which is the same as a width of the soft foam strip, and is secured against unrolling by a releasable adhesive bond;
- wherein the connecting strip is, starting from its first edge, which is firmly attached to the bottom surface of the soft foam strip, wrapped around the soft foam strip and releasably adhered to a portion of the first self-adhesive layer opposite the first edge of the connecting strip;
- wherein the connecting strip is, starting from the portion of the first self-adhesive layer, to which it is releasably adhered, folded back to form a fold and brought to the top surface of the soft foam strip, where its second edge is positioned; and
- wherein the sealing film strip which is wound up into the at least one turn, is adhered to a middle portion of the connecting strip, which is arranged on the top surface of the soft foam strip, by a releasable adhesive bond.

8. The sealing tape roll according to claim 7, wherein a fabric scrim is embedded in the first self-adhesive layer on the soft foam strip, wherein the fabric scrim is attached to the connecting strip.

9. The sealing tape roll according to claim 7, wherein the connecting strip is formed by a fabric scrim.

10. The sealing tape roll according to claim 7, wherein the connecting strip and the sealing film strip form an integral unit consisting of the same material.

11. The sealing tape roll according to claim 7, wherein the sealing film strip is formed by a nonwoven strip with an integrated vapor barrier film.

* * * * *